H. H. ALLEN.
Fence-Gate.
No. 209,151.          Patented Oct. 22, 1878.
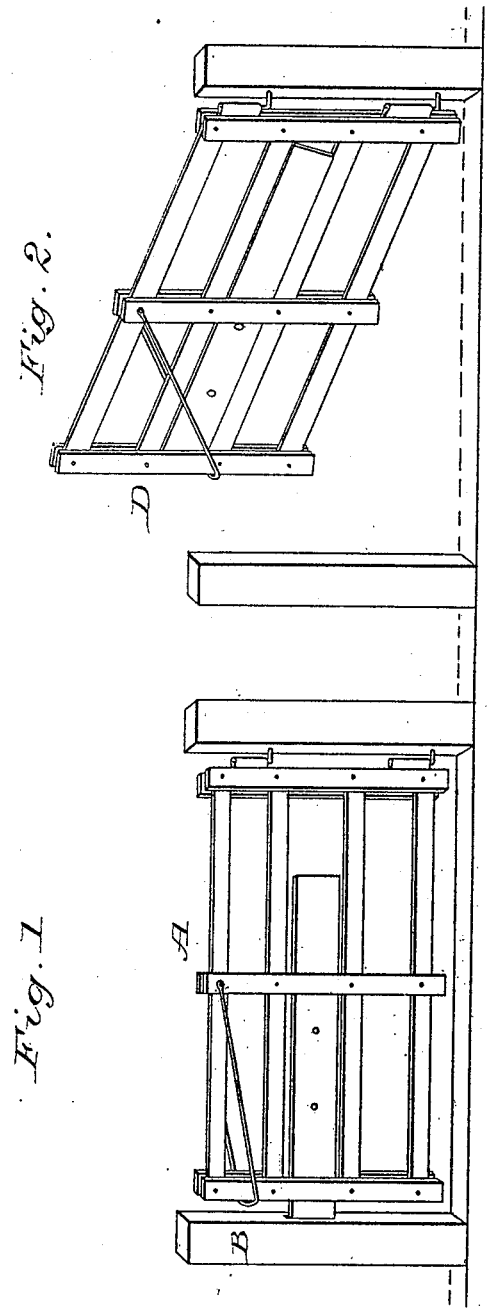
Witnesses:
Quincy A Thomas
Silas T Fenn
Inventor:
Henry H. Allen

UNITED STATES PATENT OFFICE.

HENRY H. ALLEN, OF OXFORD, MICHIGAN.

IMPROVEMENT IN FENCE-GATES.

Specification forming part of Letters Patent No. 209,151, dated October 22, 1878; application filed August 22, 1878.

*To all whom it may concern:*

Be it known that I, HENRY H. ALLEN, of Oxford, Oakland county, and State of Michigan, have invented a new and useful Improvement in Fence-Gates, of which the following is a specification:

The invention relates to fence-gates used at openings in inclosures of land, or other places where fence-gates are used.

Heretofore such gates have been constructed so as either to rise up at one end and swing, or swing without rising. The first kind have been objectionable by reason that the device for fastening and holding the gate while raised was liable to get out of repair, and was costly in its construction. The other kind are objectionable by reason of the tendency to pull the top of the post over, thereby causing the end of the gate to strike the ground when being opened, and in winter to block up with snow and ice, so that it cannot be used when required.

The object of my invention is to provide a gate that is easily constructed, at small cost, that will rise over any obstruction, and that can be held at any desired height.

The invention consists of a strap or loop of metal fastened at the center near the top of any loose-jointed gate, and passing over the end of the gate, said strap or loop being so constructed that while the gate is closed the end will just pass over the end of the gate. When the gate is raised it will drop down over the end and fasten the gate at any desired height.

In the accompanying drawing, in which similar letters of reference indicate like parts, Figure 1 represents the gate closed. Fig. 2 represents the gate open.

A B of Fig. 1 is the loop or strap, fastened at A by a bolt passing through the gate and ends of the loop or strap, and passing around the end of the gate, which is the position said loop or strap occupies when the gate is closed.

C D of Fig. 2 is the loop or strap, fastened as before mentioned, and passing around the end of the gate, as in Fig. 1, but at a point near the bottom side of the gate, holding the gate at any desired height, the height of the gate being governed by the distance said loop or strap falls from the top of the end of the gate.

What I claim, and desire to secure by Letters Patent, is—

The loop or strap A B of Fig. 1, in connection with any loose-jointed fence-gate, for the purpose substantially as set forth.

HENRY H. ALLEN.

Witnesses:
SILAS Z. FENN,
W. G. ALLEN.